E. CLARK.
Domestic Boiler.
No. 105,779.          Patented July 26, 1870.
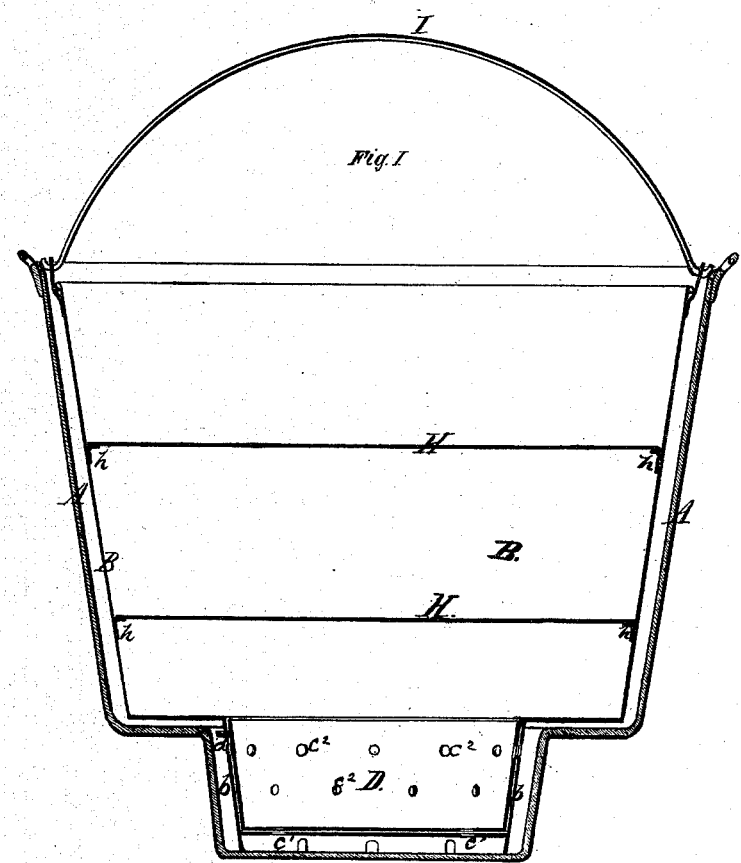
Fig. I.
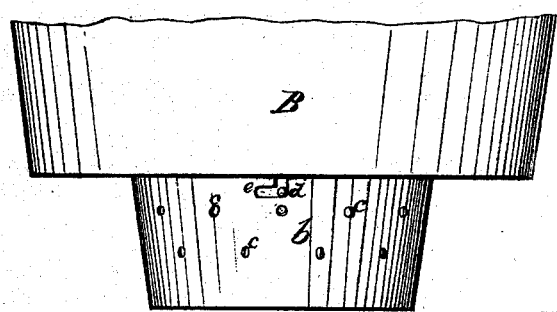
Fig. II.
Witnesses:
Victor H. Becker
Jno. J. Bonner
Inventor:
Emma Clark
by Forbush & Hyatt

United States Patent Office.

EMMA CLARK, OF BUFFALO, NEW YORK.

Letters Patent No. 105,779, dated July 26, 1870.

CULINARY VESSEL.

The Schedule referred to in these Letters Patent and making part of the same.

I, EMMA CLARK, wife of Ira Clark, of the city of Buffalo, in the county of Erie and State of New York, have invented a certain Improved Inner Vessel for Kettles, of which the following is a specification.

My invention relates to certain improvements in the method of constructing vessels, designed to fit inside of kettles, for holding vegetables and other articles while cooking, whereby such articles can be removed *en masse* from the kettle, by lifting out the inner vessel, which, being perforated at the bottom, permits the water to drain through, leaving the contents dry and unbroken in said vessel.

The invention consists in the combination and arrangement, with the perforated bottom of such inner vessel, of an adjustable and removable disk or bottom, perforated to correspond therewith, so that, by adjusting the same after the water has drained off, the perforations can be closed, so as to adapt the vessel to be used for washing, or otherwise preparing the vegetables therein.

In the accompanying drawing—

Figure I is a vertical section of my improved vessel, arranged in a kettle.

Figure II is a fragmentary view, showing the slot and pin, from the outside, by which the double bottom is adjusted.

Like letters of reference designate like parts in each of the figures.

A is the kettle, of any ordinary construction.

B, my improved inner vessel fitting therein, leaving a narrow space between them, for the circulation of the water.

$b$ is the vertical flange around the bottom, on which the vessel rests.

$c$ are notches or perforations in this flange, for the passage of the water to and from the bottom of the vessel, which is perforated, as shown at $c^1$.

D is the removable bottom, constructed to fit inside of the vessel and conform with the bottom thereof.

$c^2$ are the perforations thereof, made to coincide with those in the vessel B.

$d$ is the pin projecting from the periphery of the bottom D, through a slot, $e$, in the side of the vessel B, near its bottom.

H H represent two perforated diaphragms, resting on ledges $h$, for separating one kind of vegetable or article from another, when required; and I is an ordinary bail, by which the vessel is handled.

The manner of using my improved vessel is simple and easy. The vegetables or other articles to be cooked are placed in it, and the bottoms adjusted so that the perforations therein will coincide, when the whole, in this position, is placed in the kettle; or the vessel is first inserted and the articles afterward put therein.

Thus arranged, the water has a free circulation, as before described, around and through the inner vessel, while the flange $b$ keeps its bottom from contact with the bottom of the pot. When its contents are sufficiently cooked, or it is desired to examine the same, the vessel is raised out of the water, and held till the water drains therefrom.

The perforations are then closed by sliding the pin $d$ in the slot $e$ by means of a knife or other convenient article.

For cleaning the vessel, the bottom D is readily removed therefrom by simply inverting the former, when it will drop out, the pin and slot being constructed and arranged so as to permit this to be done.

What I claim, is—

The combination and arrangement, with the perforated bottom of vessel B, perforated flange $b$, and slot $e$, of the perforated removable bottom D and projecting pin $d$, all constructed and operating as hereinbefore set forth.

EMMA CLARK.

Witnesses:
JNO. J. BONNER,
R. B. DEVENPORT.